July 15, 1924.  C. METZ  1,501,059
STEREOSCOPIC DOUBLE MICROSCOPE
Filed June 2, 1922
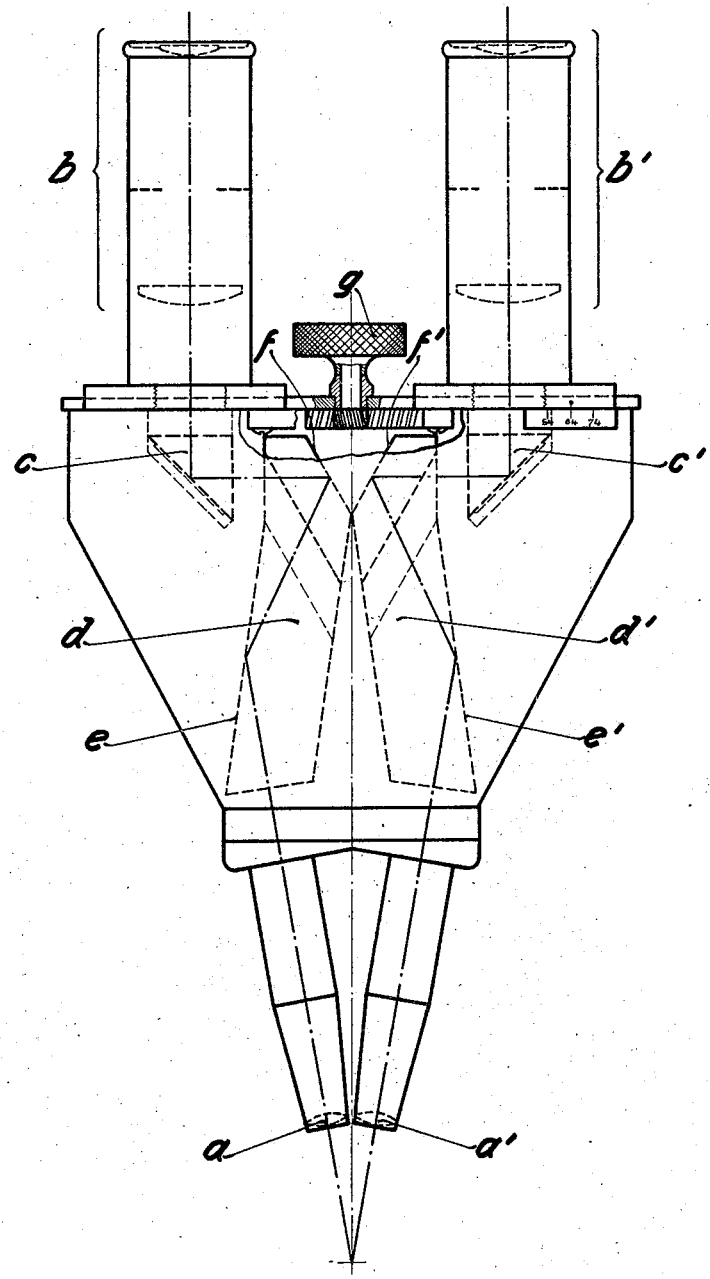
Witnesses
Fritz Engelmann
Geo. C. Gilbert.
Inventor
Carl Metz Patented July 15, 1924.

1,501,059

UNITED STATES PATENT OFFICE.

CARL METZ, OF WETZLAR, GERMANY, ASSIGNOR TO ERNST LEITZ, OPTISCHE WERKE, OF WETZLAR, GERMANY.

STEREOSCOPIC DOUBLE MICROSCOPE.

Application filed June 2, 1922. Serial No. 565,485.

*To all whom it may concern:*

Be it known that I, CARL METZ, a citizen of the Republic of Germany, residing at Wetzlar, Germany, have invented Improvements in Stereoscopic Double Microscopes (for which application has been filed in Germany, February 25th, 1922; in Austria, February 27th, 1922; and in Great Britain, May 9th, 1922), of which the following is a specification.

My invention relates to double microscopes for binocular observation and has for its object to provide a simple construction by which a correct stereoscopic impression may be obtained without straining of the eye muscles.

In my improved double microscope a pair of convergently directed objectives are arranged in combination with a pair of parallel eyepieces. Between each objectives and its eyepiece means are placed for erecting the image produced by the objective. Preferably an image-erecting prism system may be employed in which generally an even number of reflections takes place to obtain a completely erected image. The prism system may be such that the entering and outgoing rays form an angle with each other; it is preferred to form it so that the rays are not refracted either on entering or leaving.

To vary the distance between the eyepieces corresponding to the interpupilary distance of the observer any suitable means may be provided. For this purpose the image-erecting prisms systems may be composed of two separated parts, the one part of each being movable in connection with its eyepiece relatively to the other part of the prism system.

With these general statements of the objects of my invention I will now proceed to describe the embodiment thereof and the manner in which my invention is carried out, and it will be understood that while I have described as a preferable embodiment of my invention, I do not limit myself to precise conditions herein set forth, as they may be varied by those skilled in the art in accordance with the particular purposes for which they are intended, and the conditions under which they are to be utilized.

In the accompanying drawing $a$ and $a'$ are a pair of objectives with convergent axes arranged in combination with a pair of eyepieces $b$ and $b'$ having their axes parallel each other. Between each objective $a$ and its eyepiece $b$ a prism system is inserted comprising a totally reflecting right angle prism $c$ and a roof prism $d$ separated from the prism $c$ by an air space. In the prism $d$ reflection takes place first on a totally reflecting surface $e$ of usual type and afterwards on a roof portion $f$ composed of two inclined totally reflecting surfaces. The beam of light is reflected successively on each face of the roof portion $f$, so that from the latter a twice reflection results. Both prisms $c$ and $d$ have each four reflecting surfaces so arranged that the beam of light is deflected and the image produced by the objective $a$ is completely erected without refracting the optical axis on the entrance—or exit—surface of the prism system. A similar prism system comprising prisms $c'$ and $d'$ (the latter with a totally reflecting surface $e'$ and a roof portion $f'$) is arranged between the objective $a'$ and its eyepiece $b'$. The distance between the right angle prisms $c$ and $c'$ and their cooperating prisms $d$ and $d'$ can be adjusted in connection with their eyepieces $b$ respectively $b'$ with the aid of a milled head $g$ situated between the eyepiece tubes.

I claim as my invention:

1. In a stereoscopic double microscope embodying a pair of convergent objectives in combination with a pair of parallel eyepieces, an image-erecting prism system between each objective and its eyepiece.

2. In a stereoscopic double microscope embodying a pair of convergent objectives in combination with a pair of parallel eyepieces, an image-erecting prism system between each objective and its eyepiece, the surfaces of the prism system being so related to each other that the entering and outgoing rays form an angle with each other.

3. In a stereoscopic double microscope embodying a pair of convergent objectives in combination with a pair of parallel eyepieces, an image-erecting prism system between each objective and its eyepiece, the entrance-surface of the prism system being at right angles to the axis of its objective and the exit-surface being at right angles to the axis of its eyepiece.

4. In a stereoscopic double microscope embodying a pair of convergent objectives in combination with a pair of parallel eyepieces, an image-erecting prism system between each objective and its eyepiece, each prism system comprising a totally reflecting right angle prism and a roof prism having a totally reflecting surface and provided with a roof portion composed of two inclined totally reflecting surfaces.

5. In a stereoscopic double microscope embodying a pair of convergent objectives in combination with a pair of parallel eyepieces, an image-erecting prism system between each objective and its eyepiece, each prism system comprising a totally reflecting right angle prism and of roof prism having a totally reflecting surface and provided with a roof portion composed of two inclined totally reflecting surfaces, and means for adjusting the right angle prisms in connection with their eyepieces relatively to the other prisms corresponding to the interpupilary distance between the eyes of the observer.

In testimony whereof, I have signed my name to this specification.

CARL METZ.

Witness.
F. ENGELMANN.